(12) United States Patent
Song

(10) Patent No.: US 10,203,542 B2
(45) Date of Patent: Feb. 12, 2019

(54) COLOR FILM SUBSTRATE AND MANUFACTURING METHOD THEREOF

(71) Applicant: Shenzhen China Star Optoelectronics Technology Co., Ltd., Shenzhen, Guangdong (CN)

(72) Inventor: Jiangjiang Song, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 177 days.

(21) Appl. No.: 15/123,667

(22) PCT Filed: Jul. 20, 2016

(86) PCT No.: PCT/CN2016/090650
§ 371 (c)(1),
(2) Date: Sep. 5, 2016

(87) PCT Pub. No.: WO2018/000483
PCT Pub. Date: Jan. 4, 2018

(65) Prior Publication Data
US 2018/0210283 A1    Jul. 26, 2018

(30) Foreign Application Priority Data
Jul. 1, 2016 (CN) .......................... 2016 1 0519603

(51) Int. Cl.
*G02B 5/20* (2006.01)
*G02F 1/1335* (2006.01)
*G02F 1/1339* (2006.01)

(52) U.S. Cl.
CPC ....... *G02F 1/133516* (2013.01); *G02B 5/201* (2013.01); *G02F 1/1335* (2013.01); *G02F 1/1339* (2013.01); *G02F 1/133512* (2013.01); *G02F 2201/121* (2013.01)

(58) Field of Classification Search
CPC ......... G02F 1/133516; G02F 1/133512; G02F 1/134309
See application file for complete search history.

(56) References Cited

U.S. PATENT DOCUMENTS 5,212,575 A * 5/1993 Kojima ............ G02F 1/133516
349/106
5,216,414 A    6/1993 Fukutani et al.
(Continued)

FOREIGN PATENT DOCUMENTS

JP    1994281925 A    10/1994
JP    2009276552 A    11/2009
JP       4699073 B2     6/2011

*Primary Examiner* — Lucy P Chien
(74) *Attorney, Agent, or Firm* — Andrew C. Cheng

(57) ABSTRACT

The present disclosure discloses a color film substrate and a manufacturing method thereof, increase a translucent pattern with one layer has groove structure between the substrate and the color blocking pattern, and increase the contact area between the color blocking pattern and the translucent pattern through the groove structure, by means of the contact of the translucent pattern and the substrate, thereby increasing the contact area between the color blocking pattern and the substrate, it is possible to avoid the color blocking pattern peeling, to improve the quality of the product.

11 Claims, 4 Drawing Sheets

(56) References Cited

U.S. PATENT DOCUMENTS

| | | | |
|---|---|---|---|
| 2005/0134788 A1* | 6/2005 | Park | G02F 1/1333 |
| | | | 349/158 |
| 2015/0153614 A1 | 6/2015 | Qi et al. | |
| 2015/0338702 A1 | 11/2015 | Xie | |
| 2017/0038871 A1 | 2/2017 | Zhou et al. | |
| 2017/0168340 A1* | 6/2017 | Dong | G02F 1/13394 |

* cited by examiner

COLOR FILM SUBSTRATE AND MANUFACTURING METHOD THEREOF

FIELD OF THE DISCLOSURE

The present disclosure relates to a display technology field, and more particularly to a color film substrate and a manufacturing method thereof.

BACKGROUND OF THE DISCLOSURE

In the structure design of the liquid crystal display (LCD), the color filter is as an optical filter manifesting the color and is usually installed in front of the light source, so that the human eyes can receive a saturated color of the light i.e. is used to provide a color pattern to the LCD. In practical application scenarios, the color blocking pattern in the color filter will be peeling, which will forming a white highlight on the peeled position when the LCD displaying, affect the quality of the product.

SUMMARY OF THE DISCLOSURE

In view of this, the embodiment of the present disclosure provides a color film substrate and a manufacturing method thereof to increase the contact area between the color blocking pattern and the color film substrate, to avoid the color blocking pattern peeling, and improve the quality of the product.

A color film substrate of an embodiment of the present disclosure includes: a substrate; a translucent pattern arranged on the substrate, the translucent pattern forms a groove structure and the bottom of the groove structure exposures the substrate of the corresponding area; a color blocking pattern formed on the translucent pattern and filled in the groove structure; a black matrix pattern spaced formed on the translucent pattern, and the black matrix pattern is filled in the groove structure, the color blocking pattern covers the black matrix pattern; a transparent conductive layer, the transparent conductive layer is covered on the color blocking pattern; a spacer formed on the transparent conductive layer.

Wherein, the color blocking pattern includes a red color blocking pattern, a green color blocking pattern and a blue color blocking pattern adjacent to each, each the black matrix pattern is formed between the two adjacent color blocking patterns.

Wherein, the color blocking pattern includes a red color blocking pattern, a green color blocking pattern, a blue color blocking pattern and a white color blocking pattern adjacent to each, each the black matrix pattern is formed between the two adjacent color blocking patterns.

A color film substrate of the embodiment of the present disclosure includes: a substrate; a translucent pattern arranged on the substrate, the translucent pattern forms a groove structure and the bottom of the groove structure exposures the substrate of the corresponding area; a color blocking pattern formed on the translucent pattern and filled in the groove structure.

Wherein, the color film substrate further includes a black matrix pattern spaced formed on the translucent pattern and the black matrix pattern is filled in the groove structure, the color blocking pattern covers the black matrix pattern.

Wherein, the color blocking pattern includes a red color blocking pattern, a green color blocking pattern and a blue color blocking pattern adjacent to each, each the black matrix pattern is formed between the two adjacent color blocking patterns.

Wherein, the color blocking pattern includes a red color blocking pattern, a green color blocking pattern, a blue color blocking pattern and a white color blocking pattern adjacent to each, each the black matrix pattern is formed between the two adjacent color blocking patterns.

Wherein, the color film substrate further includes a transparent conductive layer and a spacer, the transparent conductive layer is covered on the color blocking pattern, the spacer is formed on the transparent conductive layer.

A manufacturing method for a color film substrate of the embodiment of the present disclosure includes: providing a substrate; forming a translucent pattern covered the substrate on the substrate, and the translucent pattern is formed a groove structure, the bottom of the groove structure exposures the substrate of the corresponding area; forming a color blocking pattern on the translucent pattern, the color blocking pattern is filled in the groove structure.

Wherein, the method further includes: forming the spaced black matrix pattern on the translucent pattern, and the black matrix pattern is filled in the groove structure, the color blocking pattern covers the black matrix pattern.

Wherein, the color blocking pattern includes a red color blocking pattern, a green color blocking pattern and a blue color blocking pattern adjacent to each, each the black matrix pattern is formed between the two adjacent color blocking patterns.

Wherein, the color blocking pattern includes a red color blocking pattern, a green color blocking pattern, a blue color blocking pattern and a white color blocking pattern adjacent to each, each the black matrix pattern is formed between the two adjacent color blocking patterns.

Wherein, the method further includes: forming a transparent conductive layer of the color blocking pattern covered on the color blocking pattern; forming a spacer on the transparent conductive layer.

The color film substrate and the manufacturing method thereof of the embodiment of the present disclosure, increase a translucent pattern with one layer has groove structure between the substrate and the color blocking pattern, and increase the contact area between the color blocking pattern and the translucent pattern through the groove structure, by means of the contact of the translucent pattern and the substrate, thereby increasing the contact area between the color blocking pattern and the substrate, it is possible to avoid the color blocking pattern peeling, to improve the quality of the product.

DETAILED DESCRIPTION OF PREFERRED EMBODIMENTS

The objects of the embodiment of the present disclosure is increase a translucent pattern with one layer has groove structure between the substrate and the color blocking pattern, and increase the contact area between the color blocking pattern and the translucent pattern through the groove structure, by means of the contact of the translucent pattern and the substrate, thereby increasing the contact area between the color blocking pattern and the substrate, it is possible to avoid the color blocking pattern peeling, to improve the quality of the product.

Figure 1:
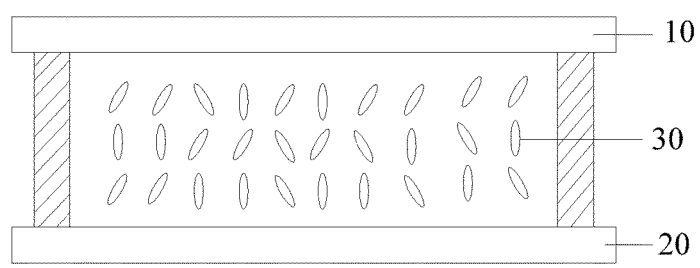
FIG. 1 is a section view of the structure of the liquid crystal display panel of the embodiment of the present disclosure.

The color film substrate also known as color filter substrate (CF substrate), refer to FIG. 1, the color film substrate 10 is as one of the substrate of the LCD and is arranged spaced with the array substrate 20 (also known as thin film transistor substrate or TFT substrate), the liquid crystal 30 is filled between the color film substrate 10 and the array substrate 20.

The following with the present disclosure in the drawings embodiment, be clear that the present disclosure in the technical implementation of the program, fully described. In the case of no conflict, the present application is characterized in the embodiment examples and embodiments may be combined with each other.

Figure 2:
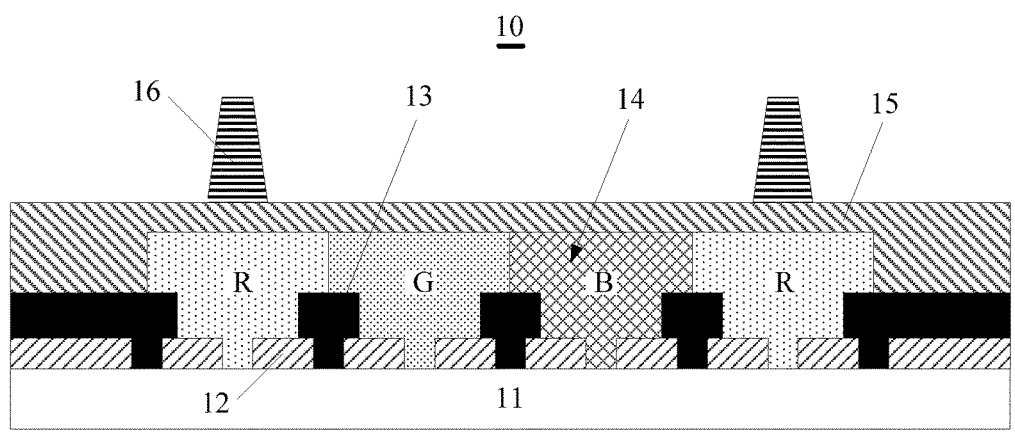
FIG. 2 is a section view of the structure of the color film substrate of the embodiment of the present disclosure.

Please refer to FIG. 2, FIG. 2 is a color film substrate of the embodiment of the present disclosure. The color film substrate 10 includes a substrate 11 and a translucent pattern 12, a black matrix pattern 13 and a color blocking pattern 14 arranged sequentially stacked on the substrate 11. Wherein, the substrate 11 may be the glass substrate, the plastic substrate, the flexible substrate, and other light-transmitting substrate. The translucent pattern 12 is covered on the substrate 11, the translucent pattern 12 is formed the groove structure 121, the bottom of the groove structure 121 exposures the surface of the substrate 11 of the corresponding area. The translucent pattern 12 includes but not limited obtained by the patterning process by the transparent photoresist layer. The black matrix pattern 13 is arranged spaced on the translucent pattern 12 and is filled in the groove structure 121 of the translucent pattern 12, so as to contact the surface of substrate 11 of the groove structure 121 exposed. The color blocking pattern 14 is formed on the translucent pattern 12 and is filled in the groove structure 121, so as to contact the surface of the substrate 11 of the groove structure 121 exposed.

In the present embodiment, the color blocking pattern 14 includes a plurality of colors, for example, shown in FIG. 2, the red color blocking pattern R, the green color blocking pattern G and the blue color blocking pattern B adjacent to each, the spaced black matrix pattern 13 is alternately arranged with the each color blocking pattern, i.e. each black matrix pattern 13 is formed between the two adjacent color blocking pattern and is used to prevent the light leakage.

Of course, in the other embodiment of the present disclosure, the color blocking pattern 14 further includes the red color blocking pattern R, the green color blocking pattern G, the blue color blocking pattern B and the white color blocking pattern adjacent to each, similarly, each black matrix pattern 13 is formed between the two adjacent color blocking pattern, is used to prevent the light leakage.

The different from the prior art is, the present embodiment increases the translucent pattern 12 with one layer has groove structure 121, it is possible to increase the contact area between the color blocking pattern 14 and the translucent pattern 12 through the groove structure 121, and the translucent pattern 12 is contact with the substrate 11, equivalent to increasing the contact area between the color blocking pattern 14 and the substrate 11, it is possible to avoid the peeling of the color blocking pattern 14, to improve the product quality.

Further, the present embodiment may also regarded as increasing the translucent pattern 12 with one layer has groove structure 121 between the substrate 11 and the black matrix pattern 13, it is possible to increase the contact area between the black matrix pattern 13 and the translucent pattern 12 through the groove structure 121, and the translucent pattern 12 is contact with the substrate 11, equivalent to increasing the contact area between the black matrix pattern 13 and the substrate 11, it is possible to avoid the peeling of the black matrix pattern 13, to improve the product quality.

Please refer to FIG. 2 and combine with FIG. 1, the color film substrate 10 further includes the transparent conductive layer 15 and the spacer 16. The transparent conductive layer 15 is covered on the color blocking pattern 14, and may be the common electrode of the liquid crystal display panel. The spacer 16 is formed on the transparent conductive layer 15, and is used to keep the distance between the color film substrate 10 and the array substrate 20, i.e. define the thickness of the liquid crystal cell. It should be noted, the above object of the embodiment of the present disclosure also may be applied to the liquid crystal display panel without arrange the spacer 16 and/or the transparent conductive layer 15. Further, the embodiment of the present disclosure also may be applied to arrange the color film substrate 10 without the black matrix pattern 13, in this case, the black matrix pattern 13 shown in FIG. 1 is arranged one side of the array substrate 20

Figure 3:
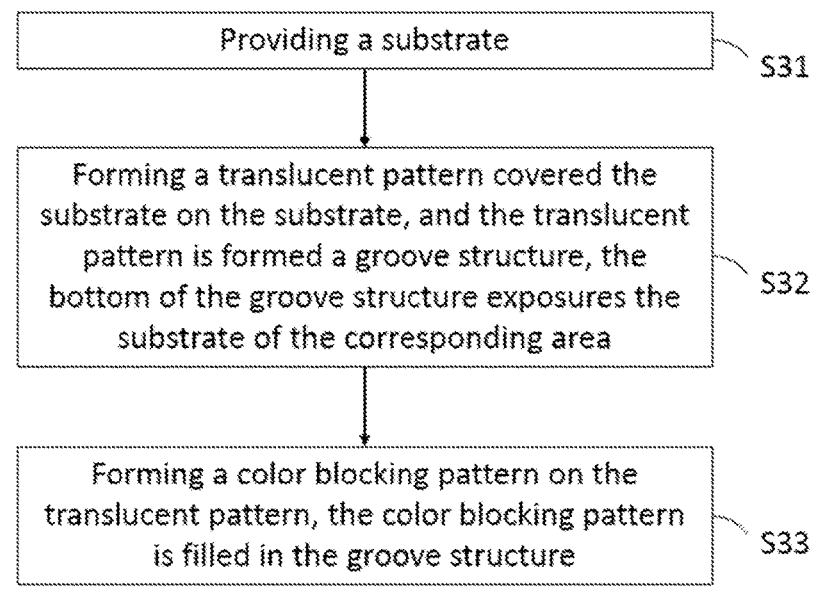
FIG. 3 is a flow diagram of the manufacturing method for the color film substrate of the embodiment of the present disclosure.

Please refer to FIG. 3, FIG. 3 is the manufacturing method for the color film substrate of the embodiment of the present disclosure. The manufacturing method may include the following steps S31~S33.

S31: providing a substrate.

S32: forming a translucent pattern covered the substrate on the substrate, and the translucent pattern is formed a groove structure, the bottom of the groove structure exposures the substrate of the corresponding area.

S33: forming a color blocking pattern on the translucent pattern, the color blocking pattern is filled in the groove structure.

Figure 4:
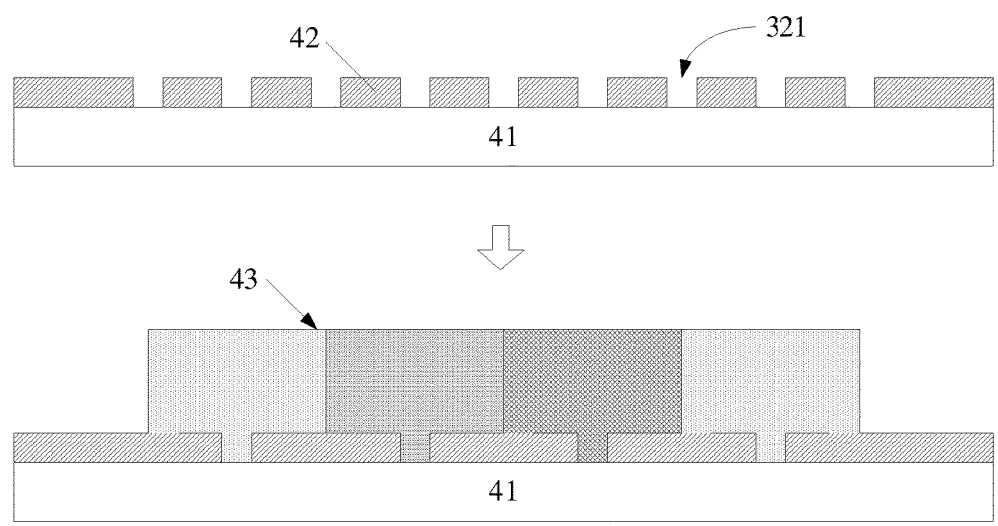
FIG. 4 is a scene schematic diagram of the manufacturing method for the color film substrate based on the FIG. 3.

Combine the FIG. 4, the present embodiment may use the mask to carry the pattern process like exposure to the transparent photoresist layer formed on the substrate 41 to obtain the translucent pattern 42 with the groove structure 421. Of course, according to the different manufacturing material of the translucent pattern 42, the embodiment of the present disclosure may use other pattern process to prepare the translucent pattern 42 with the groove structure 421.

The present embodiment may use the mask to carry the pattern process like exposure, development, etching, etc. to the color blocking formed on the translucent pattern 42 to obtain the color blocking pattern 43 with a predetermined pattern. Wherein, in view of the color blocking pattern 43 including a plurality of colors, the embodiment of the present disclosure may use the pattern process once to the color blocking pattern with the same color, may also use the pattern process once to obtain the color blocking pattern with a plurality of colors.

The color film substrate made by the present embodiment may increase the contact area between the color blocking pattern 43 and the translucent pattern 42 through the groove structure 421, and the translucent pattern 42 is contact with the substrate 41, equivalent to increasing the contact area between the color blocking pattern 43 and the substrate 41, it is possible to avoid the peeling of the color blocking pattern 43, to improve the product quality.

Figure 5:
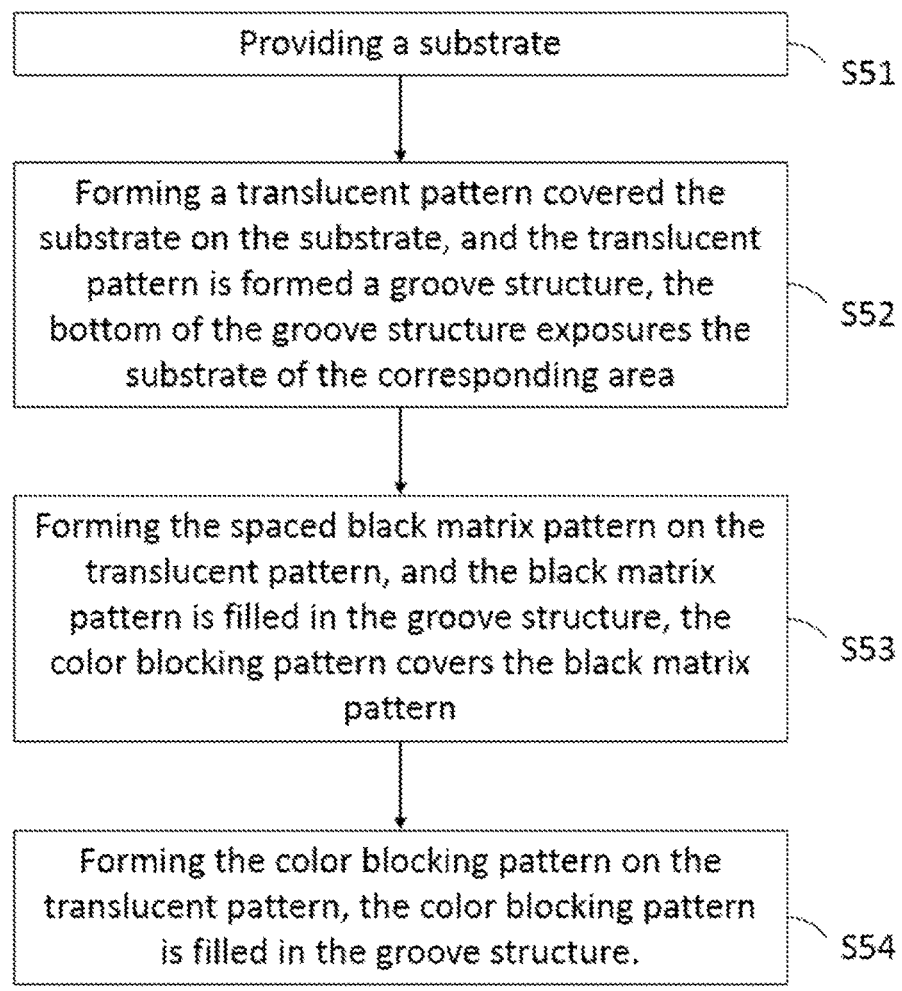
FIG. 5 is a flow diagram of the manufacturing method for the color film substrate of another embodiment of the present disclosure.

Please refer to FIG. 5, FIG. 5 is a manufacturing method for a color film substrate of another embodiment of the present disclosure. The manufacturing method may include the following steps S51~S54.

S51: providing a substrate.

S52: forming a translucent pattern covered the substrate on the substrate, and the translucent pattern is formed a groove structure, the bottom of the groove structure exposures the substrate of the corresponding area.

S53: forming the spaced black matrix pattern on the translucent pattern, and the black matrix pattern is filled in the groove structure, the color blocking pattern covers the black matrix pattern.

S54: forming the color blocking pattern on the translucent pattern, the color blocking pattern is filled in the groove structure.

Figure 6:
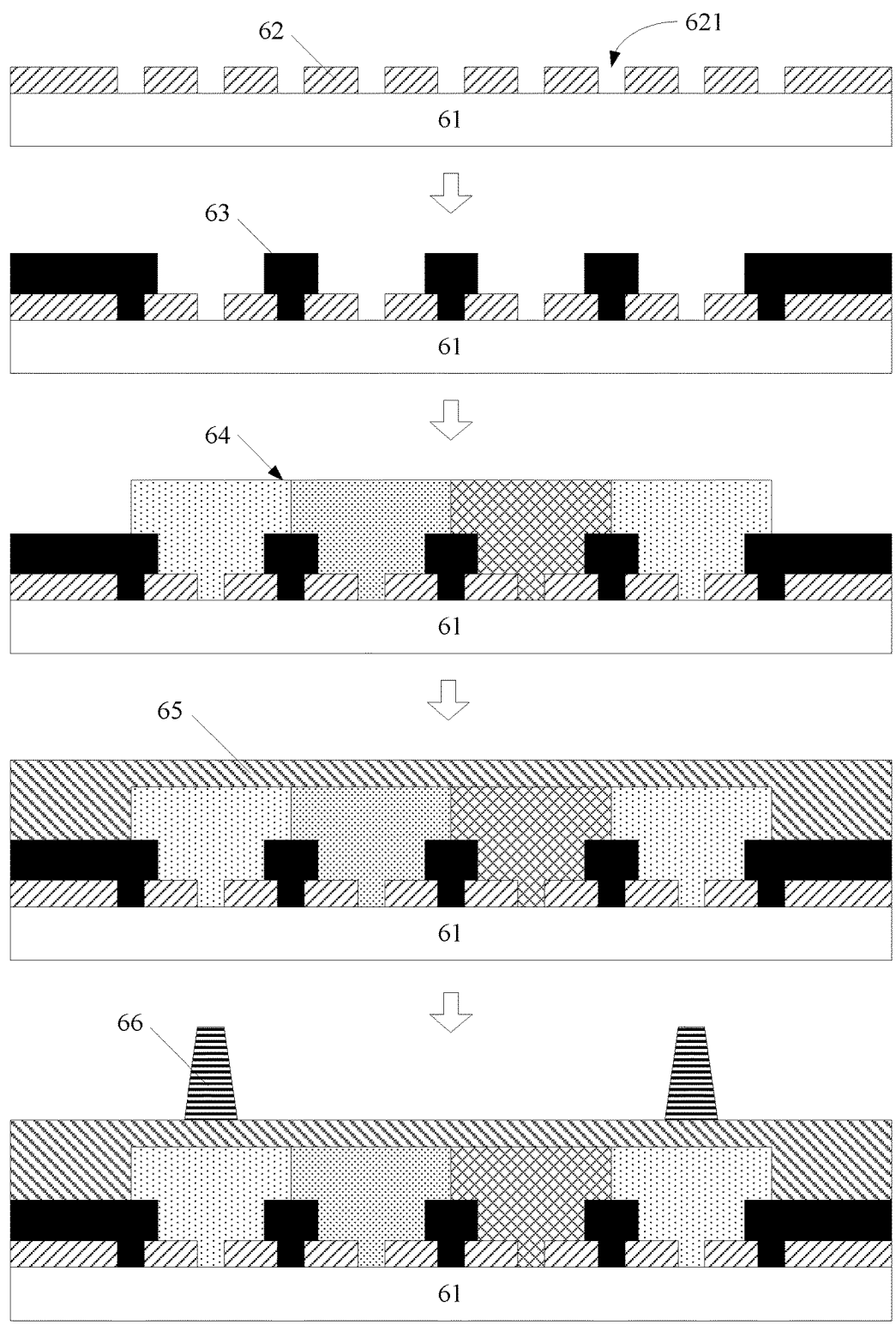
FIG. 6 is a scene schematic diagram of the manufacturing method for the color film substrate based on the FIG. 5.

Please refer to FIG. 6, based on the substrate of the above embodiment described, the present embodiment may use the mask to carry the pattern process like exposure, development, etching, etc. to the black matrix layer formed on the translucent pattern 62 to obtain the black matrix pattern 63 with a predetermined pattern. Wherein, the black matrix pattern 63 is arranged spaced on the translucent pattern 62 and is filled in the groove structure 621 of the translucent pattern 62, so as to contact the surface of substrate 61 of the groove structure 621 exposed. In the present embodiment, the color blocking pattern 64 is arranged spaced on the translucent pattern 62 and is filled in the groove structure 621 of the translucent pattern 62, so as to contact the surface of substrate 61 of the groove structure 621 exposed. The spaced black matrix pattern 63 is alternately arranged with the each color blocking pattern 64, i.e. each black matrix pattern 63 is formed between the two adjacent color blocking patterns 64 and is used to prevent the light leakage.

The color film substrate made by the present embodiment may increase the contact area between the black matrix pattern 63 and the translucent pattern 62 through the groove structure 621, and the translucent pattern 62 is contact with the substrate 61, equivalent to increasing the contact area between the black matrix pattern 63 and the substrate 61, it is possible to avoid the peeling of the black matrix pattern 63, to improve the product quality.

Please refer to FIG. 6, the manufacturing method of the embodiment of the present disclosure further includes: forming a transparent conductive layer 65 of the color blocking pattern 64 covered on the color blocking pattern 64; forming a spacer 66 on the transparent conductive layer 65. Wherein, the transparent conductive layer 65 may be the common electrode of the liquid crystal display panel. The spacer 66 is used to keep the distance between the color film substrate 10 and the array substrate 20 shown in FIG. 1, i.e. define the thickness of the liquid crystal cell. It should be noted, the present disclosure embodiment may be applied to manufacture the color film substrate without the spacer 66 and/or the transparent conductive layer 65.

In summary, the embodiment of the FIG. 3 to FIG. 6 described is used to form the color film substrate 10 of the embodiment shown in FIG. 2, each material of the structure element and the shape to be formed may be found in the above, it has the same advantageous with the above color film substrate 10.

It should be noted, the above-described embodiments of the disclosure only, and not so to limit the patent scope of the present disclosure, any use of the accompanying drawings and the description of the present disclosure is made equivalent structures or equivalent processes transform, or direct or indirect use in other Related technical fields, are included within the same reason patentable scope of the disclosure.

What is claimed is:

1. A color film substrate, wherein, the color film substrate comprises:
   a substrate;
   a translucent pattern arranged on the substrate, wherein the translucent pattern forms a plurality of groove structures and each of the groove structures exposures the substrate, and the groove structures comprises a plurality of first grooves and a plurality of second grooves;
   a black matrix pattern spaced formed on the translucent pattern, wherein the black matrix pattern is fully filled in the first grooves each between two adjacent second grooves;
   a color blocking pattern formed on the translucent pattern and the black matrix pattern, and filled in the second grooves respectively;
   a transparent conductive layer, wherein the transparent conductive layer covers the color blocking pattern;
   a spacer formed on the transparent conductive layer.

2. The color film substrate according to claim 1, wherein, the color blocking pattern comprises a red color blocking pattern, a green color blocking pattern and a blue color blocking pattern adjacent to each, each the black matrix pattern is formed between the two adjacent color blocking patterns.

3. The color film substrate according to claim 1, wherein, the color blocking pattern comprises a red color blocking pattern, a green color blocking pattern, a blue color blocking pattern and a white color blocking pattern adjacent to each, each the black matrix pattern is formed between the two adjacent color blocking patterns.

4. A color film substrate, wherein, the color film substrate comprises:
   a substrate;
   a translucent pattern arranged on the substrate, wherein the translucent pattern forms a plurality of groove structures and each of the groove structures exposures the substrate, and the groove structures comprises a plurality of first grooves and a plurality of second grooves;
   a black matrix pattern spaced formed on the translucent pattern, wherein the black matrix pattern is fully filled in the first grooves each between two adjacent second grooves;
   a color blocking pattern formed on the translucent pattern and the black matrix pattern, and filled in the second grooves respectively.

5. The color film substrate according to claim 4, wherein, the color blocking pattern comprises a red color blocking pattern, a green color blocking pattern and a blue color blocking pattern adjacent to each, each the black matrix pattern is formed between the two adjacent color blocking patterns.

6. The color film substrate according to claim 4, wherein, the color blocking pattern comprises a red color blocking pattern, a green color blocking pattern, a blue color blocking pattern and a white color blocking pattern adjacent to each, each the black matrix pattern is formed between the two adjacent color blocking patterns.

7. The color film substrate according to claim 4, wherein, the color film substrate further comprises a transparent conductive layer and a spacer, the transparent conductive layer is covered on the color blocking pattern, the spacer is formed on the transparent conductive layer.

8. A manufacturing method for a color film substrate, wherein, the method comprises:
   providing a substrate;
   forming a translucent pattern covered the substrate on the substrate, wherein the translucent pattern forms a plurality of groove structures, each of the groove structures exposures the substrate, and the groove structures comprises a plurality of first grooves and a plurality of second grooves;
   forming a spaced black matrix pattern on the translucent pattern, wherein the black matrix pattern is fully filled in the first grooves each between two adjacent second grooves;
   forming a color blocking pattern on the translucent pattern and the black matrix pattern, the color blocking pattern is filled in the second grooves respectively.

9. The method according to claim 8, wherein, the color blocking pattern comprises a red color blocking pattern, a green color blocking pattern and a blue color blocking pattern adjacent to each, each the black matrix pattern is formed between the two adjacent color blocking patterns.

10. The method according to claim 8, wherein, the color blocking pattern comprises a red color blocking pattern, a green color blocking pattern, a blue color blocking pattern and a white color blocking pattern adjacent to each, each the black matrix pattern is formed between the two adjacent color blocking patterns.

11. The method according to claim 8, wherein, the method further comprises:
    forming a transparent conductive layer of the color blocking pattern covered on the color blocking pattern;
    forming a spacer on the transparent conductive layer.

* * * * *